Patented Apr. 8, 1952

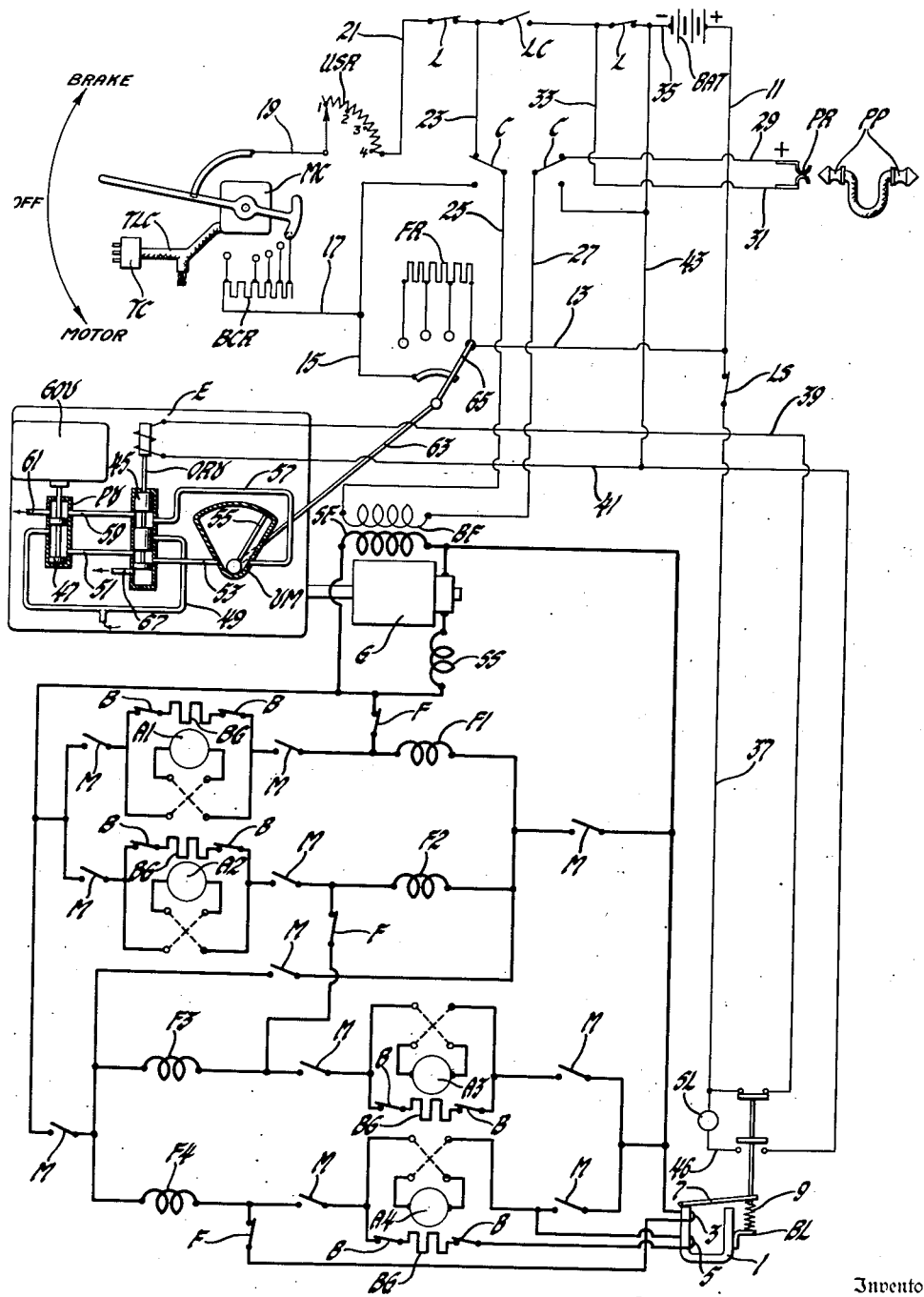

2,591,791

UNITED STATES PATENT OFFICE 2,591,791

DYNAMIC BRAKING CONTROL

Richard M. Dilworth, Hinsdale, Ill., assignor to General Motors Corporation, Detroit, Mich., a corporation of Delaware Application December 14, 1949, Serial No. 132,849

9 Claims. (Cl. 290—3)

This invention generally relates to generating electric traction and control systems for locomotives and more particularly in improvements in the dynamic braking control portion of such systems in order to regulate the dynamic braking effort of the motors throughout the motor speed range.

The principal object of the invention is to provide simple combined traction generator excitation varying means and excitation modifying means acting automatically in response to the dynamic braking current generated by the traction motors and also in response to the excitation current supplied by the traction generator to the series fields of the traction motors in order to limit the motor dynamic braking current and braking effort to safe preselected values throughout the speed range of the traction motors and locomotive.

The combined control means by which this object is accomplished, together with other novel features embodied therein, will become apparent by reference to the following detailed description and single schematic drawing showing the combined traction and dynamic braking control apparatus and electrical power and control elements and connections therebetween.

The locomotive generating electric traction apparatus comprises a diesel engine prime mover E shown directly connected to a compound electric traction generator G for supplying power and excitation current to traction motors having series field windings F1, F2, F3 and F4 and armatures A1, A2, A3 and A4. Each motor armature is operatively connected in conventional manner to a separate locomotive driving axle, not shown, having traction wheels thereon engaging the track rails.

Power circuit connections are shown in heavier lines on the drawing interconnecting the generator and traction motors. Suitable remotely controlled series and parallel motor switches M are included in the power circuit connections and these switches are closed in different combinations to connect the motors in series-parallel and parallel power locomotive driving circuit relation with the generator G. Remotely controlled motor field switches F and remotely controlled motor armature braking switches B are also shown provided in the power circuit connections.

The motor field switches F when closed, as shown, connect the motor field windings F1, F2, F3 and F4 in series across the generator G for excitation thereby and the motor braking switches B when closed, as shown, connect each of the motor armatures A1, A2, A3 and A4 across separate dynamic braking resistance grids BG of the same resistance value to cause the motors to build up as separately excited generators and retard movement of the locomotive, the power generated by the armatures being dissipated in heat by the braking grids BG.

A dynamic brake limiting relay BL is provided to act upon excessive or a preselected value of braking current in the motor armatures and braking grids and also to act upon a safe or a preselected value of excitation current in the motor field windings to reduce the generator battery field excitation current and therefore the motor excitation to limit the dynamic braking force on the locomotive to preselected values at different speeds. The brake limiting relay BL comprises a magnetic yoke 1 having a winding 3 in series with the generator circuit to the motor field windings F1, F2, F3 and F4 and another winding 5 connected in series with the motor armature A4 and braking grid BG across this armature. A relay armature 7 is normally urged away from the yoke, as shown, by a spring 9 and is provided with upper and lower contacts, the upper relay armature contact being shown normally held in contact with an upper pair of stationary relay contacts and the lower armature contact being normally held out of contact with a lower pair of stationary relay contacts by the spring. Upon a preselected value of motor field current through the winding 3, or upon a preselected value of motor armature current through the winding 5, the force of the spring 9 is overcome by the magnetic pull from either relay winding to cause the upper relay contacts to open and the lower contacts to close.

The generator battery field winding BF is shown connected in closed series circuit relation with a battery BAT by remotely controlled switches L and C, when moved to the positions shown, and by the normally closed contacts of a polarized plug receptacle PR and conductors 11, 13, 15, 17, 19, 21, 23, 25, 27, 29, 31, 33 and 35. A remotely controlled switch LS, shown closed, is connected in series with the upper normally closed contacts of the relay BL and the winding of an overriding valve ORV across the battery BAT by the conductors 11, 37, 39, 41, 43 and 35 to cause energization of the overriding valve winding and upward movement of the valve stem 45 in the valve housing to the position shown.

The normally open lower contacts of the relay BL are connected in series with a signal lamp SL between the conductors 37 and 41 by a conductor 46 so that the signal lamp is normally not illuminated.

The overriding valve ORV is shown connected by pipe connections between a vane motor VM operating the field rheostat and a pilot valve 47—PV operated by an engine driven governor GOV controlling the fuel supplied the engine and the field rheostat in a well known manner in order to cause operation of the locomotive power plant at idle speed or at any one of a plurality of preselected constant values of speed, load and output of the power plant to supply the power demand of the traction motors in driving the locomotive without overloading the engine E of the power plant. The governor GOV is provided with conventional remotely controlled speed and load setting means, not shown, by which these constant values of output from the power plant are obtained. The governor operated pilot valve 47 is shown in the engine idle position and hydraulic pressure in a suitable pressure supply pipe 49 passes through the pilot and overriding valves, with the stems in the position shown, and through pipe connections 51 and 53 to the space in the housing of the vane motor VM to the left of the vane 55 therein. The space in the motor on the opposite side of the vane 55 is relieved through pipe connections 57, 59 and 61 shown interconnecting the pilot and overriding valves. This causes clockwise movement of the vane 55, vane shaft 63 and the movable contact 65 thereon of the field rheostat FR, to normally hold the contact 65 in the minimum resistance position as shown.

The master controller MC is provided with suitable control contacts, not shown, and train-line control conductors leading therefrom, included in a train-line conduit TLC for controlling the remotely controlled governor speed setting means, not shown, and remotely controlled switches C, L and LC in the generator battery field circuit and also the remotely controlled switches M, F and B in the generator and motor power circuit connections. A train-line control connector TC provides the means for coupling and controlling similar remotely controlled means on other locomotive units when connected by their train-line control connectors for multiple unit control of coupled locomotive units by a master controller MC on one unit in a well known manner. These remotely controlled means are preferably of the electromagnetic or electropneumatic type. When a plurality of locomotive units are so connected for multiple unit control by a master controller MC the polarized receptacle plugs PR are interconnected by flexible jumper connectors having polarized plugs PP on the ends and insertable in these receptacles so that battery excitation of the battery field windings BF of the generators G of a number of locomotive units are connected in series loop relation and are supplied from the battery BAT of one unit and are controlled by the master controller MC, field rheostat FR and unit selector rheostat USR of this locomotive unit. The movable element of the selector rheostat USR is set in position 1, the maximum resistance position to control a single locomotive unit, and is moved to positions 2, 3 and 4, successive lower resistance positions, when two, three or four locomotives are connected and controlled in multiple from a master controller MC.

The train-line and control connections and contacts of the master controller MC are arranged to cause the governor GOV to be set for idling speed and the remotely controlled switches to move to the positions shown when the handle of the master controller MC is between the braking positions, as shown, from the off or stop position. The further the handle is moved away from the stop position the more resistance is cut out of the braking control rheostat BCR and the greater the excitation current supplied the series field windings F1, F2, F3 and F4 of the traction motors and the higher the generated voltage across the motor armatures A1, A2, A3 and A4 and braking grids BG in proportion to the speed of the motors and locomotive. For example, for small values of motor excitation current and high motor speeds the voltage and current in the motor armatures may rise to an excessive value. In order to limit the motor armature current and braking effort at high speeds to a safe preselected value the brake limiting relay winding 5 carrying this current causes the opening of the upper and closure of the lower relay contacts when this current reaches this preselected value. Opening of the upper relay contacts causes deenergization of the winding of the overriding valve ORV causing the valve stem 45 thereof to fall. This causes pressure application on the right side of the vane 55 of the vane motor VM through the pipe connections 49 and 57 and relief of pressure from the left side of the vane through the pipe connection 53 and a relief pipe 67 shown leading from the overriding valve ORV. The vane 55, shaft 63 and the movable contact 65 of the field rheostat accordingly are moved counterclockwise to increase the resistance of the field rheostat FR to decrease the excitation current supplied by the generator G to the motor field windings F1, F2, F3 and F4 and thereby reduce the generated current in the motor armatures and braking grids below this preselected value. This reduces the braking effort to a preselected value. Closure of lower contacts of the relay BL causes illumination of the signal lamp SL through conductors 11, 37, 46, 41, 43 and 35 to warn the locomotive engineer of excess braking current conditions and he can overcome this condition by movement of the handle of the master controller to increase the resistance in the braking controller to reduce the motor excitation current and motor armature current. When the motor armature current is reduced the contacts of the brake limiting relay BL return to the normal position causing reenergization of the overriding valve winding and causing the return of the rheostat contact 65 to the maximum resistance position by the vane motor VM and the opening of the lower relay contacts deenergizes the signal lamp SL.

As the speed of the locomotive decreases the voltage generated in the motor armatures and the braking current and effort decreases and in order to obtain greater motor braking current and braking effort the master controller handle is moved clockwise toward the maximum braking position in order to increase the generator battery field current and motor excitation current. In order to prevent excessive motor excitation current, the winding 3 of the relay BL carrying this current is likewise caused to open the upper and close the lower relay contacts at a preselected safe value and this likewise causes an increase in the resistance of the field rheostat FR by the vane motor VM and illumination of the signal light indicates reduction in the motor excitation current to a safe value. The locomotive engineer being warned of this excessive motor excitation current condition by the signal lamp corrects this condition by moving the master controller toward the off or stop position thus increasing the resistance of the braking control rheostat in like manner.

The generating electric traction and control system described above makes additional use of the vane motor operated field rheostat FR forming part of the engine and generator load regulator controlled by the engine governor GOV for reducing the motor excitation current supplied by the locomotive power plant when operating at idle speed by means of the overriding valve ORV controlled by the brake limiting relay BL. This simplifies the control system and by proper selection of the characteristics of the windings 3 and 5 and the spring 9 of the brake limiting relay BL the braking effort desired throughout the entire speed range of the traction motors may be automatically obtained to satisfy various locomotive operating conditions.

When more than one locomotive unit is controlled by a master controller MC on one unit all of the remote switches operate in the manner described to obtain dynamic braking except the swithces L and LC on the units other than the one on which the master controller is operated. The switches L and LC on these other units move to the opposite position from that shown in order to complete series loop excitation circuit from the battery of the locomotive on which the controller is operated to the generator battery field windings of the other locomotive units.

I claim:

1. A locomotive dynamic braking system comprising an electric traction motor having an armature for driving and for being driven by the locomotive, and a field winding, a braking resistor connected directly across the motor armature, a prime mover generator power plant, power connections interconnecting the power plant generator and motor field winding, power output regulating means for the power plant and means responsive to the current generated by the motor armature in the braking resistor for controlling the power output controlling means of the power plant to limit the current generated in the motor armature and braking resistor and thereby limiting braking force exerted by the motor armature when driven by the locomotive.

2. A locomotive dynamic braking system comprising an electric motor having an armature driven by the locomotive, and a field winding, a braking resistor connected directly across the motor armature, a prime mover generator power plant, power output regulating means for the power plant, power connections interconnecting the generator and motor field windings to cause the motor to build up as a generator and supply power to the resistor and thereby retard rotation of the motor armature by the locomotive, and control means acting in response to the current in the motor field windings and to the current generated by the motor armature to limit the retarding force exerted on the locomotive by the motor armature.

3. In a locomotive, a prime mover generator power plant, speed responsive power output regulating means for the power plant, locomotive traction motors, each having an armature for driving and braking the locomotive and an excitation winding, power connections connecting the power plant generator and motor excitation windings, a braking resistor connected across each motor armature to dissipate the power generated thereby in heat and apply braking force to the locomotive, manually operable means for controlling the power plant output and speed responsive output regulating means to regulate the excitation of the motors and the current generated in the braking resistor by the motor armature and thereby control the braking force on the locomotive, means overriding the speed responsive output control means, and means acting in response to a preselected value of motor excitation current and also to a preselected value of motor armature current to control the overriding means to limit the current generated by the motor armatures and thereby limit the braking force in the locomotive to preselected values.

4. In a generating electric locomotive, a prime mover, an electric generator driven thereby, a plurality of traction motors arranged to drive and to be driven by the locomotive, generator excitation and output regulating and limiting means, manual control means for the regulating means, power connections interconnecting the motor field windings to the generator for excitation thereby, separate braking resistors connected directly across each motor armature to dissipate the energy generated thereby when excited by the generator and driven by the locomotive to provide locomotive braking action and control means for the generator excitation limiting means acting in response to a preselected value of motor armature current at high locomotive speeds and also acting at a preselected value of motor excitation current at low locomotive speeds to limit the braking action of the motors at high and low values of locomotive speed.

5. In a generating electric locomotive, a power plant including an electric generator, a prime mover driving the generator, a plurality of traction motors arranged to drive and to be driven by separate locomotive traction wheels, power connections interconnecting the generator and motors and including switching means, separate braking resistors for each motor, speed responsive power plant output regulating means, overriding means for the speed responsive output regulating means, a braking control resistor for varying the excitation and output of the generator, a manual controller movable in a braking control range to operate the braking control resistor, to control the speed responsive output regulating means in order to cause low output of the power plant, and to control the switching means in order to connect the braking resistors across the motor armatures and thereby control the braking force exerted on the locomotive by the motors, and means acting automatically upon preselected values of motor excitation and motor armature current to control the overriding means and limit the motor braking action to preselected values.

6. In a generating electric locomotive, a prime mover generator power plant, speed responsive power plant speed and generator excitation and output control means, overriding means for the speed responsive control means to limit the generator excitation and output, a plurality of locomotive traction motors, a braking resistor for each motor, a braking control resistor for also controlling the generator excitation and output, electrical connections including switching means interconnecting the generator and motors, a manually operable master controller for controlling the speed responsive control means and the switching means and for also controlling said braking control resistor to cause the motor field windings to be connected across the generator for excitation thereby under control of the speed responsive means and the braking control rheostat and to connect each of the braking resistors across the motor armatures to establish a dynamic braking circuit and a dynamic braking relay acting upon preselected high values of motor excitation and motor armature braking current for controlling the overriding means to limit the braking force exerted by the motors to preselected values at low and high locomotive speed.

7. In a generating electric locomotive, a prime mover, a generator driven thereby, an excitation winding circuit for the generator including a field rheostat, a braking control resistor, a source of excitation current and switching means, control means acting in response to the speed of the prime mover for controlling the speed of the prime mover and field rheostat to cause operation of the prime mover and generator at a constant low value of speed, load and output, overriding means for the speed responsive means to reduce the generator excitation and output, a plurality of locomotive traction motors for driving and braking the locomotive, power and braking connections interconnecting the generator and motors and including separate motor braking resistors, and switches for connecting the motor fields to the generator and a braking resistor across each motor armature, a master controller operable to control the speed responsive means, the switching means, the switches and the braking control resistor in order to connect the motor field windings across the generator and to connect the motor armatures across the braking resistors and to connect the rheostat and braking control resistors in series in the generator excitation circuit, and a relay acting in response to preselected values of motor excitation and armature current to control the overriding means and cause a reduction in the generator output to limit the motor braking action to preselected values.

8. In a generating electric locomotive, an engine, an electric generator driven thereby having an excitation circuit including excitation control means comprising a rheostat, a braking resistor, a source of excitation current, a unit selector resistor, a polarized receptacle having normally closed contacts and switching means for connecting the excitation control means in series relation, a jumper having polarized plugs insertable in separate polarized receptacles on adjacent locomotives to connect the excitation control means on adjacent locomotives in series for control by one braking control resistor, the unit selector resistor being set for the number of locomotive units so connected, engine speed responsive means normally causing operation of the engine at idle speed and for causing movement of the rheostat to the maximum resistance position, overriding means for the speed responsive means causing movement of the rheostat to the minimum resistance position, a plurality of locomotive traction motors for dynamic braking of the locomotive, a braking grid for each motor, power connections including other switching means for connecting the motor fields in series with the generator and the motor armatures across the braking resistors to establish a dynamic braking circuit, a master controller including train-line and control connections for controlling the speed responsive means and switching means on one or more locomotive units and for operating the braking control resistor on one unit, and a braking limit relay including one winding responsive to a preselected high value of motor excitation current and another winding responsive to a preselected high value of motor armature or braking current for controlling the overriding means to reduce the generator output and motor excitation current and thereby reduce the braking force of the motors to preselected values independent of the setting of the braking control resistor by the master controller.

9. In a generating electric locomotive, a prime mover generator power plant having speed responsive prime mover fuel and generator excitation regulating means, overriding means for the excitation regulating means, speed setting means for the speed responsive means to cause operation of the prime mover at preselected constant values of speed load and output, a braking control rheostat, a unit selector resistance, a polarized receptacle having normally closed contacts, a separate source of generator excitation current and excitation switching means to connect the generator excitation regulating means in series with said source for driving the locomotive or to connect the braking control rheostat, unit selector resistance and polarized receptacle in series with said source and generator excitation regulating means to control the braking of the locomotive, a plurality of traction motors arranged to drive and to be driven by the locomotive, braking resistors for the motors, power connections including driving and braking switches to connect the motors in driving relation with the generator when excited for driving or in braking circuit relation in which the motor armatures are connected across separate braking resistors and the motor fields are connected across the generator for excitation thereby when the generator excitation is controlled for braking, a braking limit relay acting in response to preselected values of motor field and armature or braking current for controlling the overriding means to reduce the generator excitation and output to the motor field windings to limit the motor braking action to preselected values, a master controller movable to driving and braking position, train-line and control connections interconnecting the speed setting means and the excitation switching means and driving and braking switching means to control driving and braking of the locomotive unit or other locomotives connected in multiple therewith by the train-line and control connections, and connectors including polarized plugs interconnecting the polarized receptacle plugs on adjacent locomotives to connect the excitation means on the generators of other connected locomotives in series braking control relation, the unit selector resistance being manually cut out in steps depending upon the number of generator excitation means connected in series braking relation.

RICHARD M. DILWORTH.

REFERENCES CITED

The following references are of record in the file of this patent:

UNITED STATES PATENTS

| Number | Name | Date |
|---|---|---|
| 1,168,048 | Beach | Jan. 11, 1916 |
| 1,196,778 | Henderson | Sept. 5, 1916 |
| 1,415,971 | Albrecht | May 16, 1922 |
| 1,706,169 | Jones et al. | Mar. 19, 1929 |
| 2,154,279 | Muller | Apr. 11, 1939 |
| 2,304,895 | Dilworth et al. | Dec. 15, 1942 |
| 2,318,043 | Austin | May 4, 1943 |
| 2,397,226 | Weybrew | Mar. 26, 1946 |
| 2,406,424 | King | Aug. 27, 1946 |
| 2,445,460 | Suyder | July 20, 1948 |